United States Patent
Lee et al.

(10) Patent No.: US 7,840,406 B2
(45) Date of Patent: Nov. 23, 2010

(54) METHOD FOR PROVIDING AN ELECTRONIC DICTIONARY IN WIRELESS TERMINAL AND WIRELESS TERMINAL IMPLEMENTING THE SAME

(75) Inventors: Jong-Kerl Lee, Gumi-si (KR); Soon-Jin Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 947 days.

(21) Appl. No.: 11/700,080

(22) Filed: Jan. 31, 2007

(65) Prior Publication Data

US 2007/0233482 A1    Oct. 4, 2007

(30) Foreign Application Priority Data

Feb. 7, 2006   (KR) .................. 10-2006-0011666
May 23, 2006   (KR) .................. 10-2006-0046048

(51) Int. Cl.
    *G10L 21/06*     (2006.01)
(52) U.S. Cl. ..................................... 704/251
(58) Field of Classification Search ............ 704/251
    See application file for complete search history.

(56) References Cited

U.S. PATENT DOCUMENTS

| 6,085,162 | A | * | 7/2000 | Cherny ................. 704/277 |
| 6,138,087 | A | * | 10/2000 | Budzinski ................. 704/9 |
| 6,219,646 | B1 | * | 4/2001 | Cherny ................. 704/277 |
| 6,345,245 | B1 | * | 2/2002 | Sugiyama et al. ........... 704/10 |
| 7,088,853 | B2 | * | 8/2006 | Hiroe et al. ............... 382/153 |
| 7,142,715 | B2 | * | 11/2006 | Fahmy et al. ............... 382/187 |

FOREIGN PATENT DOCUMENTS

KR    1020050120014 A    12/2005

\* cited by examiner

*Primary Examiner*—Susan McFadden
(74) *Attorney, Agent, or Firm*—Roylance, Abrams, Berdo & Goodman, L.L.P.

(57) ABSTRACT

A method and wireless terminal for providing an electronic dictionary function in the wireless terminal having the electronic dictionary are provided, in which a word is searched in the electronic dictionary, which corresponds to characters input through a character recognition mode, when the wireless terminal is in a word search mode; when more than a threshold number of words are found, a voice recognition mode is executed; and a word is searched through the character recognition mode, which corresponds to voice input through the voice recognition mode.

20 Claims, 12 Drawing Sheets

(A)

(B)

(A)

(B)

(C)

METHOD FOR PROVIDING AN ELECTRONIC DICTIONARY IN WIRELESS TERMINAL AND WIRELESS TERMINAL IMPLEMENTING THE SAME

PRIORITY

This application claims the benefit under 35 U.S.C. §119(a) of a Korean Patent Application filed in the Korean Intellectual Property Office on Feb. 7, 2006 and assigned Ser. No. 2006-11666 and on May 23, 2006 and assigned Ser. No. 2006-46048, the entire disclosure of both of which are hereby incorporated by reference.

BACKGROUND OF THE INVENTION

1. Field of the Invention

The present invention relates to a method for searching for words in a wireless terminal. More particularly, the present invention relates to a method and wireless terminal for providing an electronic dictionary, in which words can be searched by character recognition and voice recognition when an electronic dictionary function is used through the wireless terminal.

2. Description of the Related Art

Generally, a wireless terminal represents an apparatus, which provides a function for performing communication while moving or exchanging data, such as a cellular phone, a Personal Digital Assistant (PDA), a Personal Communication Services (PCS) Phone, an International Mobile Telecommunication-2000 (IMT-2000) terminal, and a Global System for Mobile communication (GSM) terminal.

Such wireless terminal performs a telephone communication function, and has recently provided various supplementary services including a camera function, a digital broadcasting reception function, a game function, and an MPEG Audio layer-3 (MP-3) file playback function, and the like, as well as a short message transmission and reception function, a memory function for storing and searching for phone numbers, a locking function, an alarm function, a background scene setup function and an area code check function. A mobile communication terminal provides many conveniences to users living in modern society through the above-described various supplementary services.

Currently, a favorite field of users is a foreign language field. Accordingly, apparatuses and methods for aiding foreign language learning have been developed. The most popular product is a wireless electronic notebook having an electronic dictionary function. Such an electronic notebook is portable and is convenient to use compared to an existing wordbook or dictionary. However, the electronic notebook is considerably expensive. Further, a user may be inconvenienced in carrying both a wireless device and an electronic notebook.

Therefore, there is a need for an improved method and device for providing an electronic dictionary function, as well as supplementary service functions, in the wireless terminal, and for conveniently using the electronic dictionary.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and device providing an electronic dictionary in a wireless terminal that can conveniently contribute to foreign language learning, such as word search and conversation learning, regardless of time and place, by using the electronic dictionary provided in the wireless terminal.

It is another aspect of exemplary embodiments of the present invention to provide a method and device providing an electronic dictionary, in which, when an electronic dictionary function is used through a wireless terminal, words can be searched through character recognition, and desired words can be searched for through voice recognition again when the desired words are not found.

It is further another aspect of exemplary embodiments of the present invention to provide a method and device providing an electronic dictionary, in which, when an electronic dictionary function is used through a wireless terminal, words can be searched through character recognition, and a corresponding word is selected through a check box when multiple words are found.

It is still another aspect of exemplary embodiments of the present invention to provide a method and device providing an electronic dictionary, in which, when an electronic dictionary function is used through a wireless terminal, words can be searched through character recognition, and words desired by a user are searched through a network when the desired words are not found.

In accordance with one aspect of exemplary embodiments of the present invention, there is provided a method and device providing an electronic dictionary in a wireless terminal having the electronic dictionary, in which a word is searched in the electronic dictionary, which corresponds to characters input through a character recognition mode, when the wireless terminal is in a word search mode; when more than a threshold number of words are found, a voice recognition mode is executed; a word is searched for through the character recognition mode, which corresponds to voice input through the voice recognition mode; and a content of the electronic dictionary corresponding to the searched word is displayed and the searched word is stored in a word search list.

In accordance with another aspect of exemplary embodiments of the present invention, there is provided a method and device providing an electronic dictionary in a wireless terminal having the electronic dictionary, in which a word is searched in the electronic dictionary, which corresponds to characters input through a character recognition mode, when the wireless terminal is in a word search mode; when words are not found, a voice recognition mode is executed; a word is searched through the voice recognition mode in the electronic dictionary corresponding to voice input; and a content of the electronic dictionary corresponding to the searched word is displayed and the searched word in a word search list is stored.

In accordance with a further aspect of exemplary embodiments of the present invention, there is provided a method and device providing an electronic dictionary in a wireless terminal having the electronic dictionary, in which a word is searched in the electronic dictionary, which corresponds to characters input through a character recognition mode, when the wireless terminal is in a word search mode; when multiple words have been found, the searched words as well as a check box are displayed; and when a corresponding word is selected from the displayed words, a content of the electronic dictionary corresponding to the selected word is displayed.

In accordance with still another aspect of exemplary embodiments of the present invention, there is provided a method and device providing an electronic dictionary in a wireless terminal having the electronic dictionary, in which a word is searched in the electronic dictionary, which corresponds to character data input through a character recognition mode, when the wireless terminal is in a word search mode; when words are not found, the input character data is transmitted to a word search server; when a response message is received from the word search server, the received response message is analyzed; when a word searched in the word search server exists, a content of the searched word is displayed; and when a storage key is input, the searched word is stored in a word search list, and the content of the displayed word is updated to the electronic dictionary.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
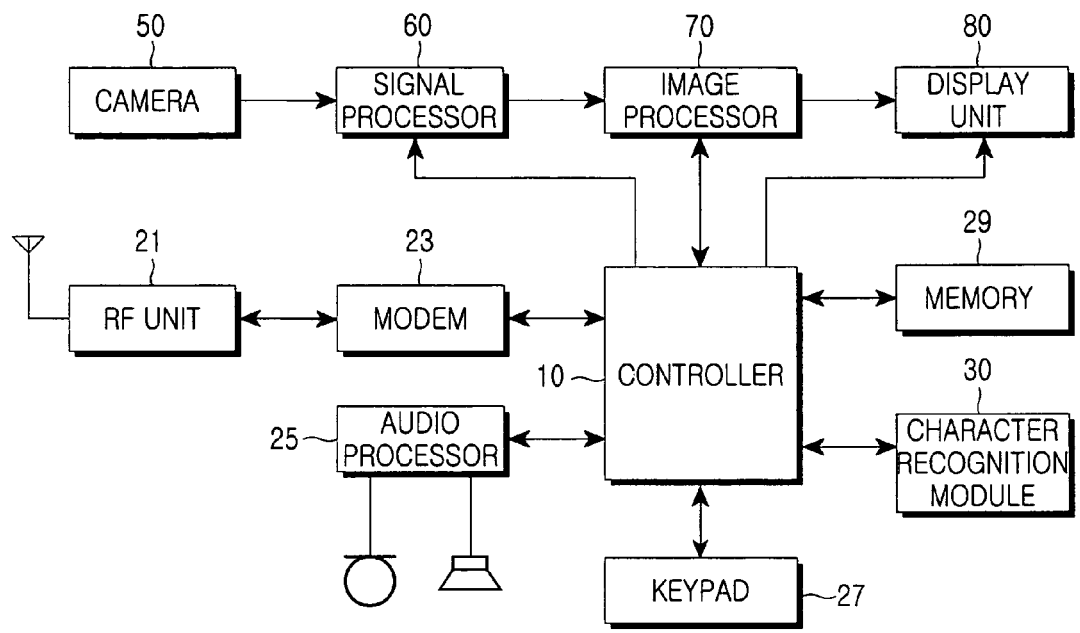
FIG. 1 is a block diagram illustrating a construction of a wireless terminal according to an exemplary embodiment of the present invention.

FIG. 1 is a block diagram illustrating a construction of a wireless terminal according to an exemplary embodiment of the present invention. The wireless terminal may include a mobile telephone.

Referring to FIG. 1, a Radio Frequency (RF) unit 21 performs communication of the wireless terminal. The RF unit 21 includes a RF transmitter for up-converting and amplifying the frequency of transmitted signals, a RF receiver for low-noise amplifying received signals and down-converting the frequency of the received signals, and the like.

A modem 23 includes a transmitter for coding and modulating the transmitted signals, a receiver for demodulating and decoding the received signals, and the like.

An audio processor 25 may include a codec. The codec includes a data codec for processing packet data, and an audio codec for processing audio signals such as voice. The audio processor 25 converts digital audio signals received through the modem 23 into analog signals through the audio codec for reproduction, or converts analog audio signals generated from a microphone into digital audio signals through the audio codec and transmits the digital audio signals to the modem 23. The codec may be separately provided or included in a controller 10. Further, in an electronic dictionary mode, the audio processor 25 receives voice for a word to be searched for from a microphone (MIC), transmits the received voice to the controller 10, and outputs the pronunciation of a native speaker for the searched word to a speaker (SPK).

A keypad 27 includes keys for inputting numeral and character information, and function keys for setting various functions. Further, the key input unit 27 may have a character recognition mode key, a voice recognition mode key, a menu key, a confirmation key, a cancellation key, a transmission key, a selection key, an end key, and the like, according to an exemplary embodiment of the present invention.

A memory 29 may include a program memory and a data memory. The program memory stores programs for controlling general operations of the wireless terminal. According to an exemplary embodiment of the present invention, the program memory stores both a program for allowing words, which correspond to characters recognized through a character recognition module 30, to be searched for through an electronic dictionary function, and a program for allowing words, which correspond to characters recognized through the audio processor 25, to be searched for through the electronic dictionary function. Further, the program memory stores a program for selecting a corresponding word through a check box when multiple words have been found. The program memory also stores a program for searching for a corresponding word to be searched for through a network when the word does not exist in an electronic dictionary database. Moreover, the program memory stores a program for arranging and displaying searched words according to a word search list display menu when the words are checked.

The data memory temporarily stores data generated during the execution of the programs. According to an exemplary embodiment of the present invention, the data memory stores electronic dictionary data and a search list of words searched for by a user.

The controller 10 controls the general operations of the wireless terminal, which may also include the modem 23 and the codec. In a word search mode according to an exemplary embodiment of the present invention, the controller 10 controls words, which correspond to characters input through a character recognition mode to be searched for in a provided electronic dictionary. As a result of the search, if more than a threshold number of words are found, the controller 10 controls a voice recognition mode to be executed, and controls words, which correspond to voice input through the voice recognition mode, to be searched for in the searched words. Further, the controller 10 controls the content of the electronic dictionary corresponding to the searched word to be displayed, and controls the displayed content to be stored in a word search list. In the word search mode according to an exemplary embodiment of the present invention, the controller 10 controls the words, which correspond to the characters input through the character recognition mode, to be searched for in the electronic dictionary. As a result of the search, if no words are found, the controller 10 controls the voice recognition mode to be executed.

Further, in the word search mode, if multiple words are found, the controller 10 controls multiple searched words to be displayed together with the check box. If a user selects a corresponding word and inputs the confirmation key using the keypad 27, the controller 10 controls the content of the electronic dictionary corresponding to the selected word to be displayed.

Furthermore, in the word search mode, if the searched words do not exist in the electronic dictionary database, the controller 10 controls a network search indication message to be displayed. If a user inputs the transmission key (network search permission key) using the keypad 27, the controller 10 controls corresponding character data to be transmitted to a word search server. If a response message is received from the word search server, the controller 10 analyzes the response message, and controls both words searched for by the word search server and the content of the words to be displayed.

In order to view the searched words, if "display in alphabetical order" is set, the controller 10 controls words within the word search list to be arranged and displayed in alphabetical order. If "display in storage order" is set, the controller 10 controls words within the word search list to be arranged and displayed in an order in which the words are stored in the word search list. Further, if "display in frequency order" is set, the controller 10 controls words within the word search list to be arranged and displayed in an order in which the words have been confirmed.

A character recognition module 30 may include a scanner module capable of recognizing characters.

A camera 50 includes a camera sensor for photographing image data and converting photographed optical signals into electric signals. It is assumed that the camera sensor is a Charge-Coupled Device (CCD) sensor. In an exemplary implementation, the camera 50, a signal processor 60 and an image processor 70 may be integrated into a single module and be used as the character recognition module 30.

The signal processor 60 converts image signals output from the camera 50 into image signals. The signal processor 60 may be implemented by a Digital Signal Processor (DSP).

The image processor 70 generates screen data for displaying image signals output from the signal processor 60. The image processor 70 transmits the received image signals according to a standard of a display unit 80 under the control of the controller 10, and compresses and decompresses the image data. Further, the image processor 70 transmits the start address value of the image data displayed on the display unit 80, and differently sets and transmits the start address value under the control of the controller 10.

The display unit 80 displays the image data output from the image processor 70. The display unit 80 may use a Liquid Crystal Display (LCD). In this case, the display unit 80 may include a LCD controller, a memory capable of storing image data, a LCD display device, and the like. The display unit 80 displays user data output from the controller 10. In an exemplary implementation, the user data represent icons for indicating the states of the wireless terminal such as receiver sensitivity of an antenna, whether communication is possible, whether an alarm has been set and a battery level. In the word search mode, the display unit 80 displays word search results and content of the electronic dictionary corresponding to searched words. Further, the display unit 80 displays the word search list under the control of the controller 10 according to an exemplary embodiment of the present invention. When the LCD has a touch screen function, the keypad 27 and the LCD may operate as an input unit. The display unit 80 includes an image data display unit to which the image data are output.

Hereinafter, an operation of the wireless terminal will be described with reference to FIG. 1. When a call is originated, if a user performs a dialing operation through the keypad 27 and sets an originating mode, the controller 10 detects the setup of the originating mode, processes dial information received through the modem 23, converts the dial information into RF signals through the RF unit 21, and outputs the RF signals. Then, if response signals are received from a communication partner, the controller 10 detects the reception of the response signals through the RF unit 21 and the modem 23. Then, a voice speech path is formed through the audio processor 25, so that the user performs a communication function. Further, in a terminating mode, the controller 10 detects the terminating mode through the modem 23 and generates ring signals through the audio processor 25. Then, if a user responds to the ring signals, the controller 10 detects the user's response. Accordingly, a voice speech path is formed through the audio processor 25 as in the above case, so that the user performs a communication function. In the originating mode and the terminating mode, voice communication is described as an example. However, in addition to the voice communication, data communication for transmitting and receiving packet and image data may also be performed. Further, in the case of a waiting mode or text communication, the controller 10 displays text data processed through the modem 23 on the display unit 80.

Hereinafter, an operation process of the wireless terminal according to the word search mode will be described. If a user inputs a word search mode key using the keypad 27, the controller 10 detects the input of the word search mode key, controls the memory 29 and the character recognition module 30 to execute the character recognition mode. Then, the controller 10 searches for words, which correspond to characters input through the character recognition mode, in the electronic dictionary. As a result of the search, when more than a threshold number of words are found or when no words are found, the controller 10 controls the memory 29 and the audio processor 25 to execute the voice recognition mode, and then searches for words corresponding to voice input through the voice recognition mode. Further, the controller 10 controls the display unit 80 and the audio processor 25 to display the content of the electronic dictionary corresponding to the searched word and output the pronunciation of the searched word. Furthermore, the controller 10 controls the memory 29 to store the searched word in the word search list.

Figure 2A:
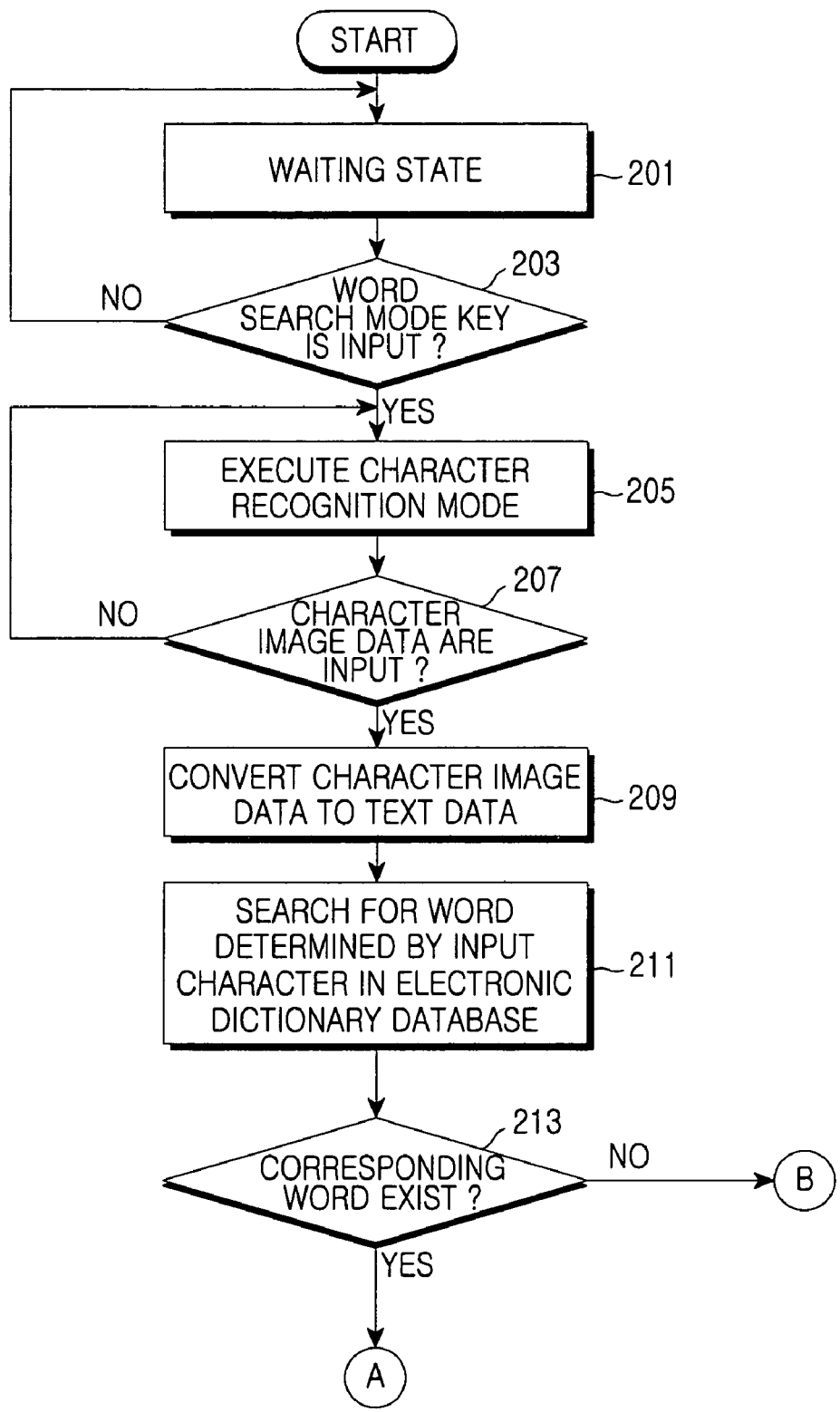
FIGS. 2a to 2c are flow diagrams illustrating a word search operation in a wireless terminal according to an exemplary embodiment of the present invention.
Figure 2B:
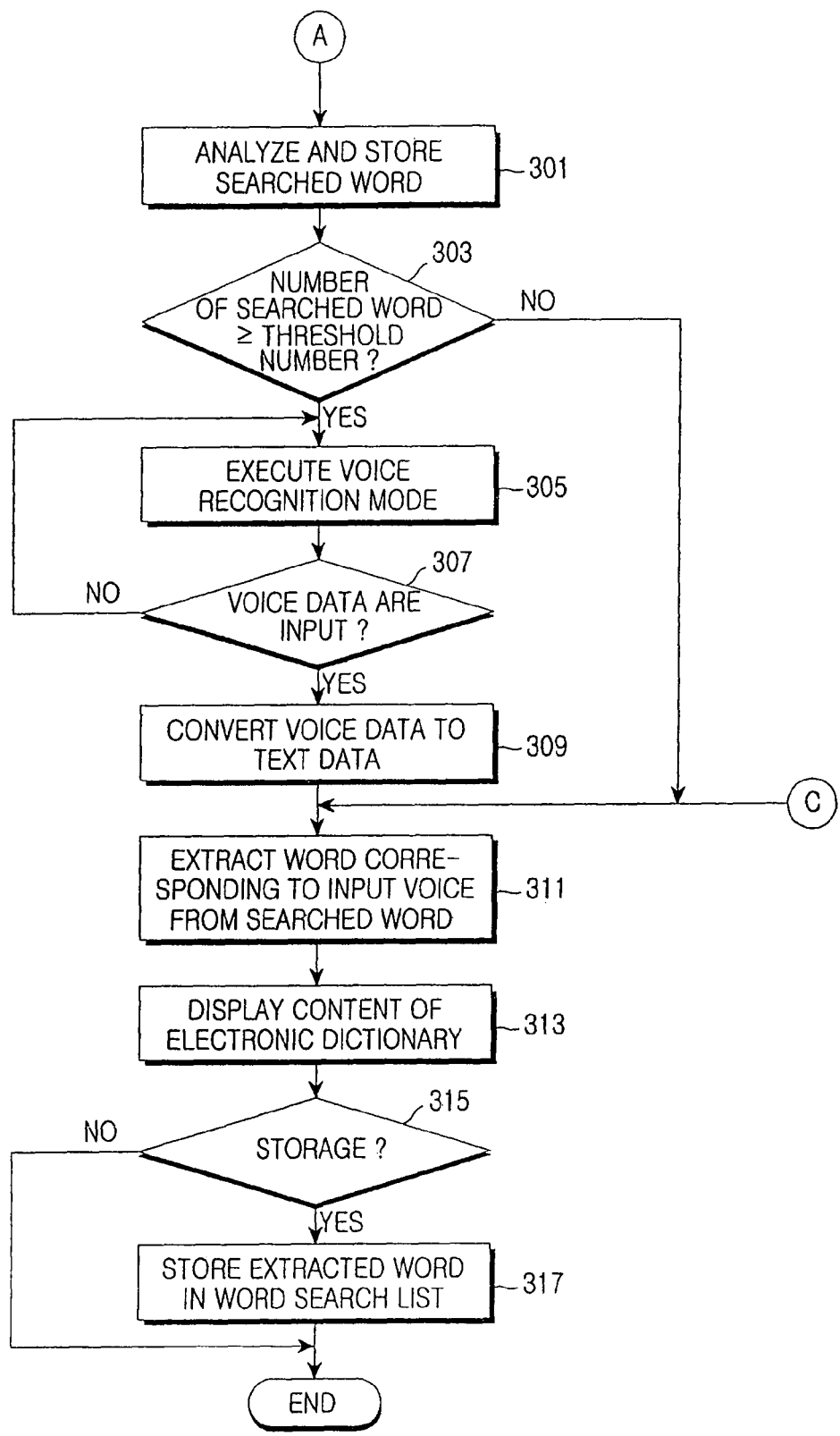
Figure 2C:
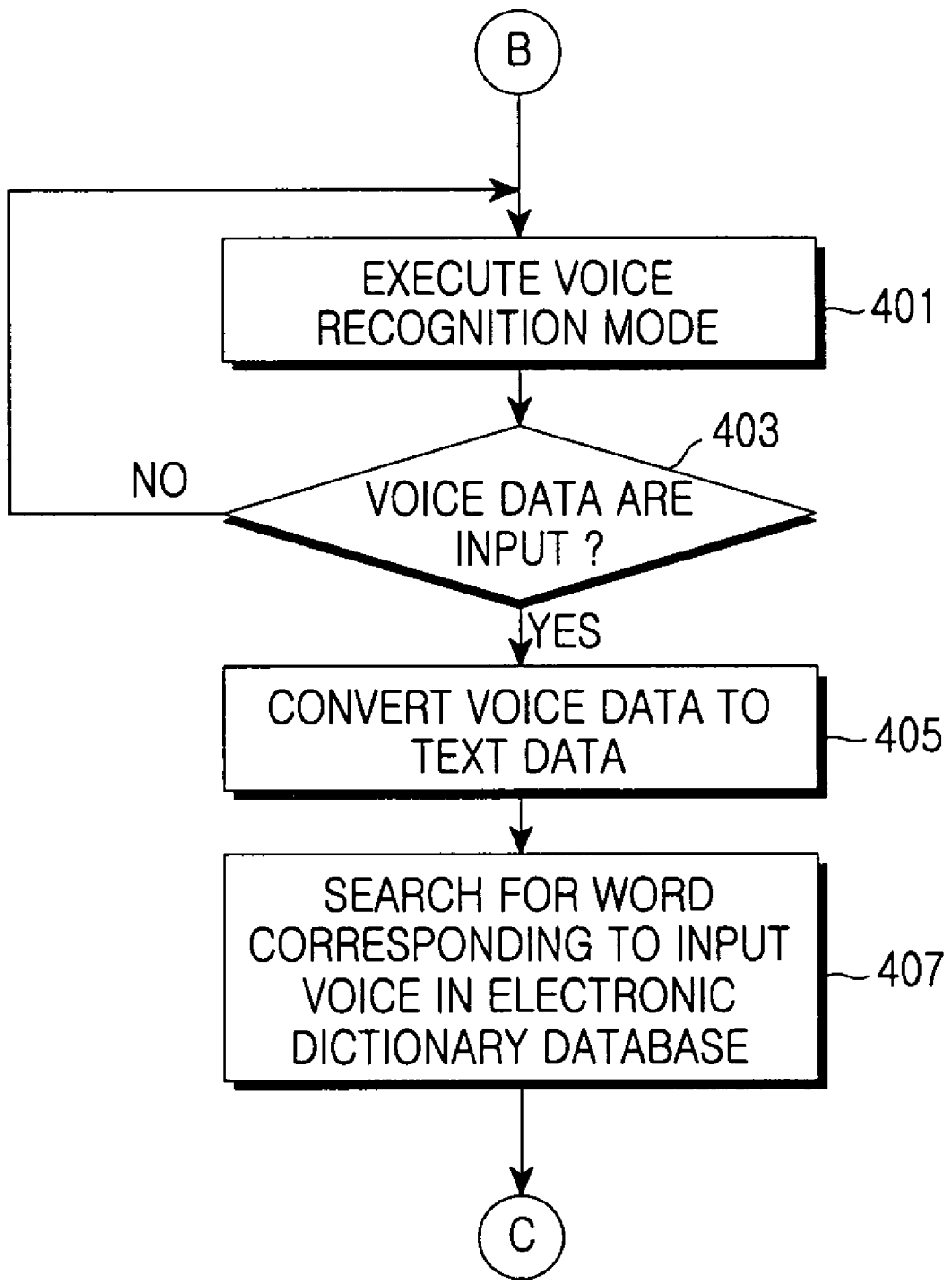
Figure 6:
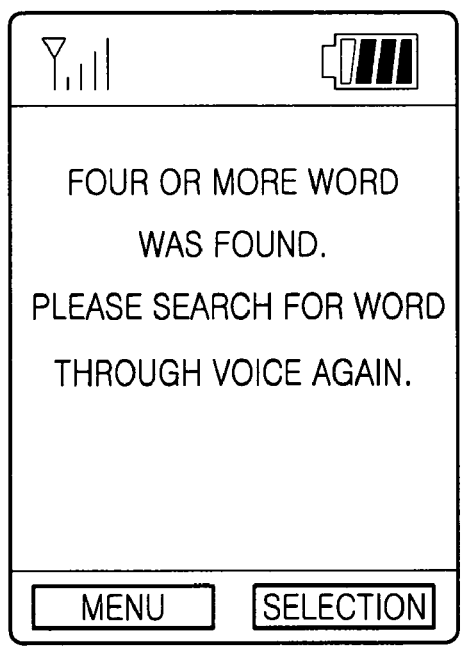
FIGS. 6a and 6b are diagrams illustrating a word search operation applied to an exemplary embodiment of the present invention.
Figure 6:
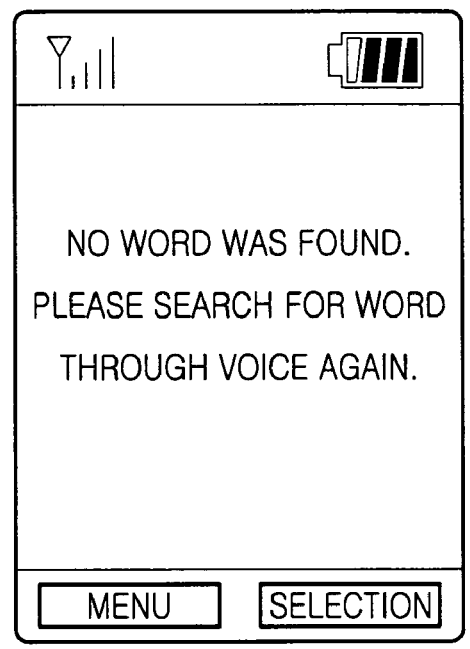

FIGS. 2*a* to 2*c* are flow diagrams illustrating a word search operation in the wireless terminal according to an exemplary embodiment of the present invention, and FIG. 6 is a flow diagram illustrating the word search operation applied to an exemplary embodiment of the present invention. Hereinafter, an operation for searching for words through the character recognition mode and then searching for words through the voice recognition mode according to the search results in the wireless terminal having the electronic dictionary function will be described with reference to FIGS. 2*a* to 2*c* and FIG. 6. If a user inputs the word search mode key using the keypad 27 in step 201 (waiting state), the controller 10 detects the input of the word search mode key in step 203. In step 205, the controller 10 controls the memory 29 and the character recognition module 30 to execute the character recognition mode. In the character recognition mode, the controller 10 differentiates black character regions from white background regions through the character recognition module 30 such as a scanner. For example, the controller 10 further thickens the black character regions and lightens the white background regions. Then, the controller 10 recognizes the differentiated black character regions as character regions.

If characters are input through the character recognition module 30 in the character recognition mode, the controller 10 detects the input of the characters in step 207. In step 209, the controller 10 controls the memory 29, recognizes the input characters as image data, converts the image data into code values, and converts the code values into text data. In an exemplary implementation, if an error occurs in which the corresponding characters are not recognized more than a threshold number of times during the character recognition mode, the voice recognition mode may be executed in step 401.

In step 211, the controller 10 controls the memory 29 and searches for a word determined by the input characters in the electronic dictionary database.

As a result of the search, if the word determined by the input characters exists, the controller 10 detects the existence of the word in step 213. Then, step 301 is performed. However, if the word determined by the input characters does not exist, the controller 10 detects the absence of the word in step 213. Then, step 401 is performed.

First, the case in which the word determined by the input characters exists will be described. In step 301, the controller 10 analyzes the word searched for in the electronic dictionary database in step 211, and stores the analyzed word. In an exemplary implementation, the controller 10 may store the searched word in the memory 29 or a temporary buffer.

In step 303, the controller 10 determines if the number of searched words exceeds a threshold number, for example four.

As a result of the determination, if the number of searched words exceeds the threshold number, for example four, the controller 10 executes a voice recognition mode in step 305. In an exemplary implementation, the controller 10 may manually execute the voice search mode using a menu key or a special key, or may execute the voice search mode after displaying a predetermined message as illustrated in FIG. 6*a*. In the voice search mode, the controller 10 recognizes voice according to a character sequence sequentially input through the microphone. For example, if a user sequentially pronounces the word "people" as "pi:", "i:", "pi:", "el" and "i:", the controller 10 combines "pi:", "i:", "ou", "pi:", "el" and "i:" into "people" and recognizes a dictionary meaning of "people". Further, the controller 10 recognizes voice according to the syllables of a word input through the microphone. For example, if a user pronounces the word "people" into two syllables "people" and "ple", the controller 10 recognizes pronunciations of the two syllables as "pi:" and "pl". Furthermore, in the voice search mode, a feature vector sequence of voice is extracted; the extracted feature vector sequence is weighted so that a vocabulary including the feature vector sequence can be found. Accordingly, an exemplary embodiment of the present invention is not limited to the above-described voice recognition, that is, voice recognition through a character sequence menu and voice recognition through a syllable menu.

If a user inputs voice and the voice is input through the microphone in the voice recognition mode, the controller 10 detects the input of the voice in step 307. In step 309, the controller 10 controls the memory 29 and the audio processor 25 to convert the input voice data to text data. In step 311, the controller 10 controls the memory 29 and extracts a word corresponding to the input voice from the words found in the character recognition mode. In step 313, the controller 10 controls the memory 29 and the display unit 80 to display the content of the electronic dictionary corresponding to the extracted word. Then, if the user inputs the storage key using the keypad 27, the controller 10 detects the input of the storage key in step 315. In step 317, the controller 10 controls the memory 29 to store the extracted word in the word search list.

Next, the case in which the word determined by the input characters does not exist will be described. In step 401, the controller 10 executes the voice search mode. The controller 10 may manually execute the voice search mode using a menu key or a special key, or may execute the voice search mode after displaying a predetermined message as illustrated in FIG. 6*b*. In an exemplary implementation, when the word determined by the input characters does not exist may include a case in which the recognized character has been searched for in a dictionary of a different type of language, that is, a case in which a Spanish character has been recognized but has been searched for in a English dictionary, or when a character has not been recognized due to an error in the character recognition operation, and the like. In an exemplary implementation, if the error in the character recognition operation occurs more than a threshold number of times according to setup, the voice search mode may be executed or a manual mode for inputting a corresponding character using a keypad may be executed.

In the voice search mode, voice is recognized according to a character sequence sequentially input through the microphone, or voice is recognized according to the syllables of a word input through the microphone. Further, a feature vector sequence of voice is extracted, the extracted feature vector sequence is weighted, and a vocabulary including the feature vector sequence may be found.

If a user inputs voice and the voice is input through the microphone in the voice recognition mode, the controller 10 detects the input of the voice in step 403. In step 405, the controller 10 controls the memory 29 and the audio processor 25 to convert the input voice data to text data. In step 407, the electronic dictionary database is searched for a word corresponding to the input voice. In step 311, the controller 10 controls the memory 29 and extracts a word corresponding to the input voice from the electronic dictionary database. In step 313, the controller 10 displays the content of the electronic dictionary corresponding to the extracted word. Then, if the user inputs the storage key using the keypad 27, the controller 10 detects the input of the storage key in step 315. In step 317, the controller 10 stores the extracted word in the word search list.

Figure 3A:
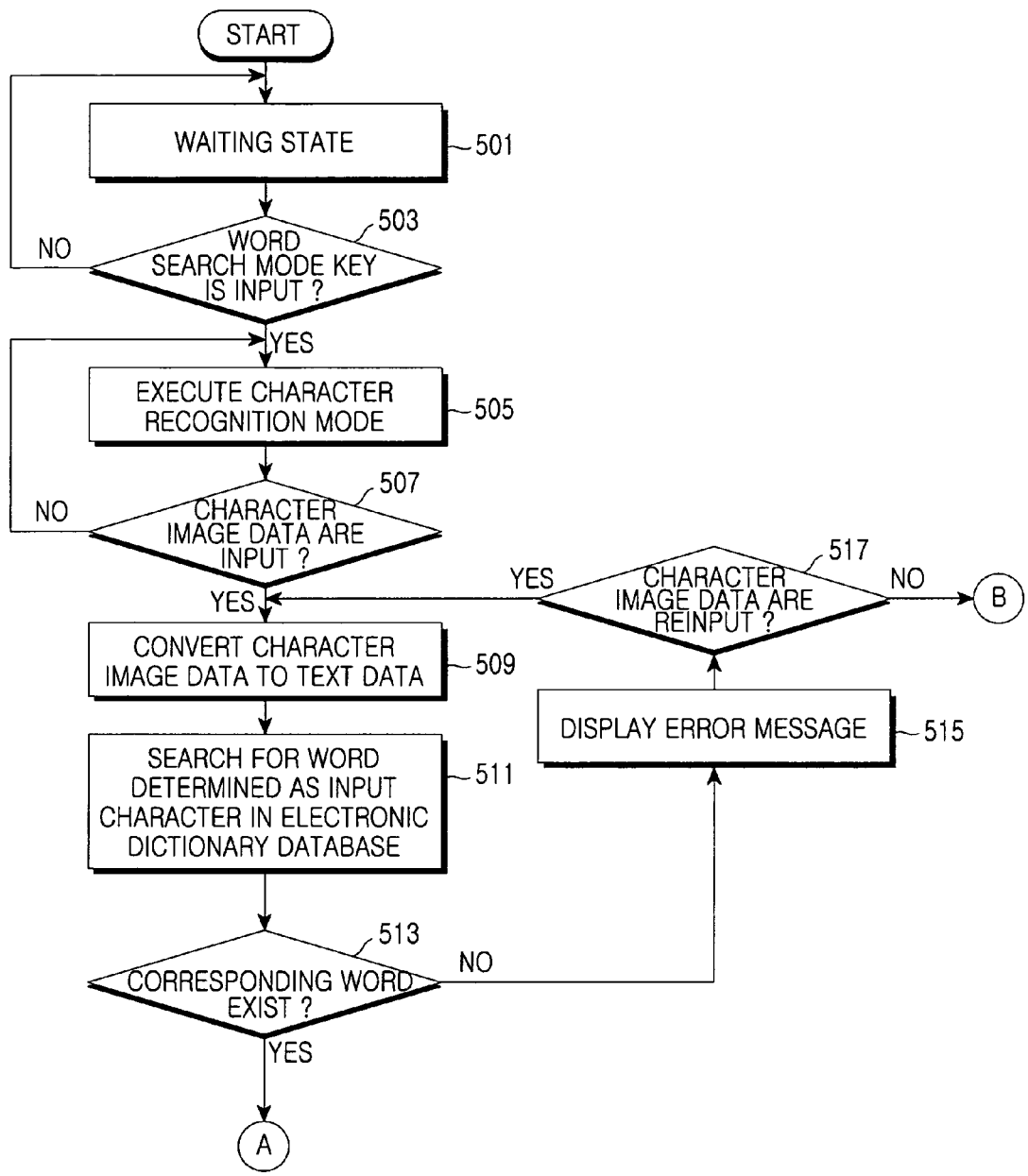
FIGS. 3a and 3b are flow diagrams illustrating a word search operation in a wireless terminal having an electronic dictionary function according to an exemplary embodiment of the present invention.
Figure 3B:
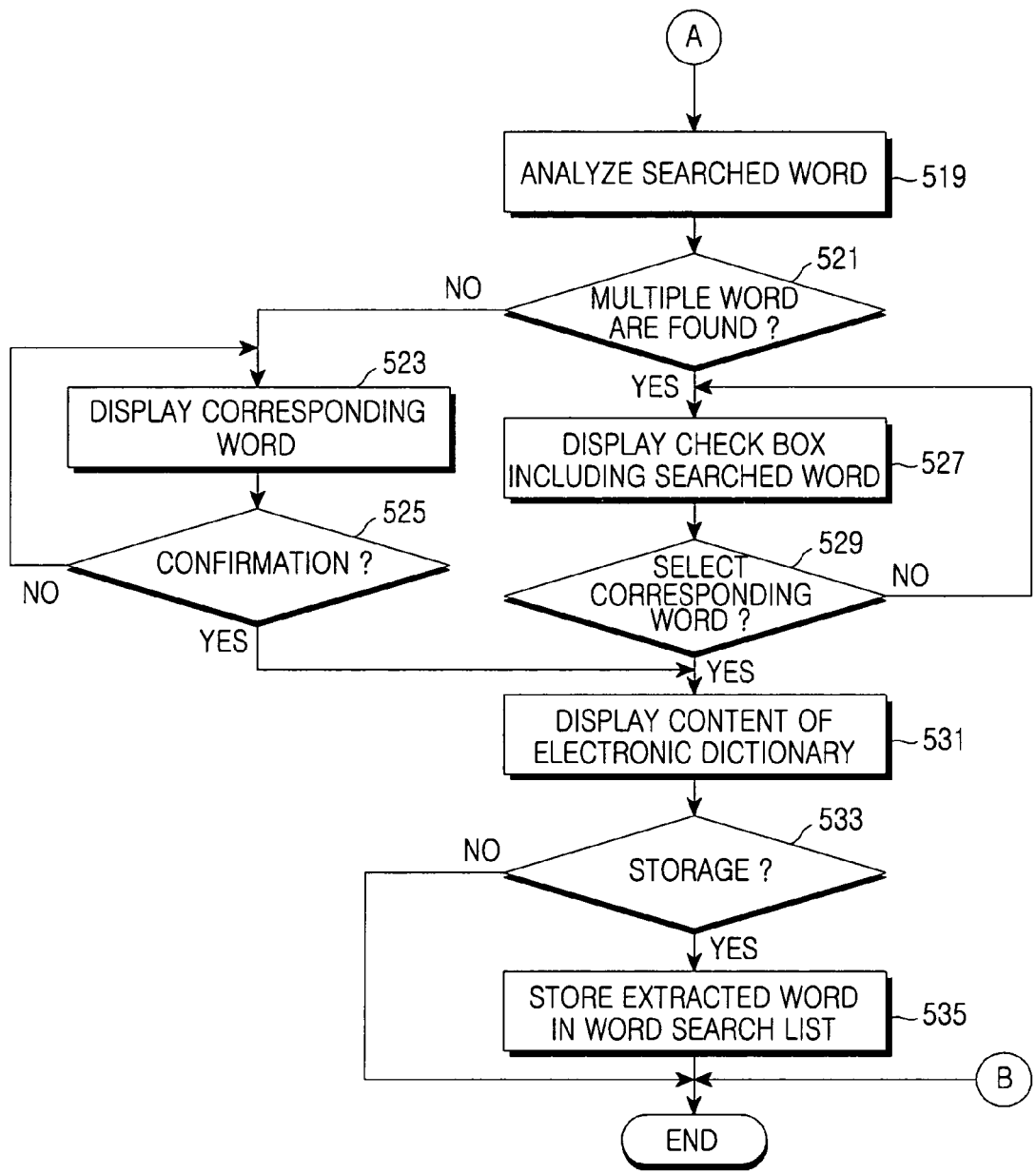
Figure 7:
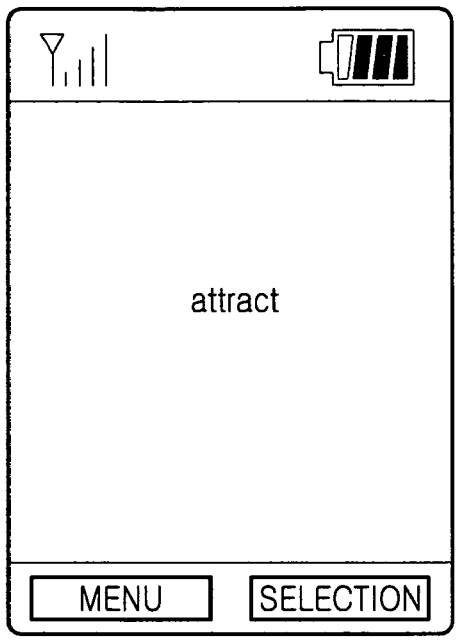
FIGS. 7a to 7c are diagrams illustrating a word search operation applied to an exemplary embodiment of the present invention.
Figure 7:
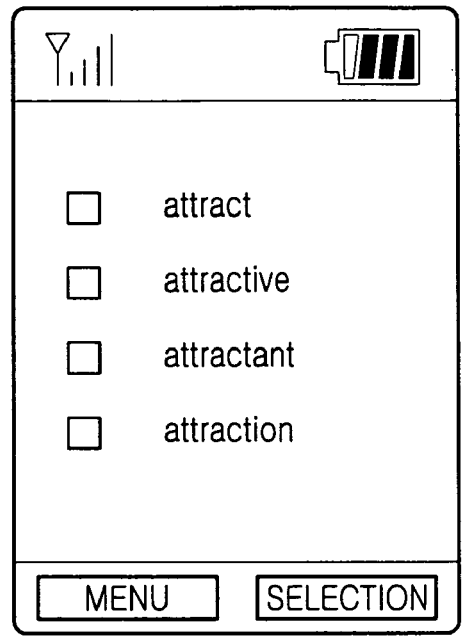
Figure 7:
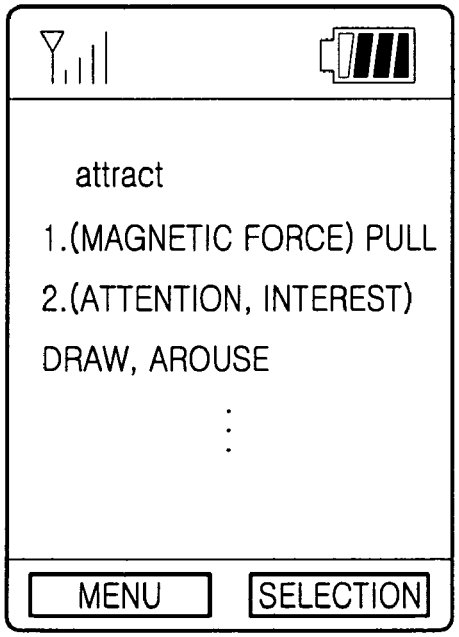

FIGS. 3*a* and 3*b* are flow diagrams illustrating a word search operation in the wireless terminal having the electronic dictionary function according to an exemplary embodiment of the present invention, and FIG. 7 is a flow diagram illustrating the word search operation applied to an exemplary embodiment. Hereinafter, an operation for searching for words through the character recognition mode, and selecting and displaying a corresponding word when multiple words are found in the wireless terminal having the electronic dictionary function will be described with reference to FIGS. 3*a*, 3*b* and FIG. 7. If a user inputs the word search mode key using the keypad 27 in step 501 (waiting state), the controller 10 detects the input of the word search mode key in step 503. In step 505, the controller 10 controls the memory 29 and the character recognition module 30 to execute the character recognition mode. In the character recognition mode, the controller 10 differentiates black character regions from white background regions through the character recognition module 30 such as a scanner. For example, the controller 10 further thickens the black character regions and lightens the white background regions. Then, the controller 10 recognizes the differentiated black character regions as character regions.

If characters are input through the character recognition module 30 in the character recognition mode, the controller 10 detects the input of the characters in step 507. In step 509, the controller 10 controls the memory 29, recognizes the input characters as image data, converts the image data into code values, and converts the code values into text data. In an exemplary implementation, if an error occurs in which the corresponding characters are not recognized more than a threshold number of times during the character recognition mode, an error message may be displayed.

In step 511, the controller 10 controls the memory 29 and searches for a word determined by the input characters in the electronic dictionary database.

As a result of the search, if the word determined by the input characters does not exist, the controller 10 detects the absence of the word in step 513. In step 515, the controller 10 controls the memory 29 and the display unit 80 to display an error message. If the user reinputs the word search mode key using the keypad 27, the controller 10 detects the input of the word search mode key in step 517 and reinputs the character image data through the character recognition module 30.

However, if the word determined by the input characters exists, the controller 10 detects the existence of the word in step 513.

In step 519, the controller 10 controls the memory 29, analyzes the word searched for in the electronic dictionary database, and stores the analyzed word. In an exemplary implementation, the controller 10 may store the searched word in the memory 29 or a temporary buffer.

As a result of the analysis, if one word has been found, the controller 10 detects that one word has been found in step 521. In step 523, the controller 10 controls the memory 29 and the display unit 80 to display the searched word as illustrated in FIG. 7a. Then, if the user inputs the confirmation key using the keypad 27 in step 525, the controller 10 controls the memory 29 and the display unit 80 to display the content of the electronic dictionary corresponding to the searched word as illustrated in FIG. 7c, in step 531.

However, if multiple words have been found, the controller 10 detects that multiple words have been found in step 521. In step 527, the controller 10 controls the memory 29 and the display unit 80 to display the searched words as well as the check box as illustrated in FIG. 7b. Then, if the user selects a corresponding word and inputs the confirmation key using the keypad 27, the controller 10 detects the input of the confirmation key in step 529. In step 531, the controller 10 controls the memory 29 and the display unit 80 to display the content of the electronic dictionary corresponding to the selected word as illustrated in FIG. 7c.

If the user inputs the storage key using the keypad 27, the controller 10 detects the input of the storage key in step 533. In step 535, the controller 10 stores the searched or selected word in the word search list.

Figure 4A:
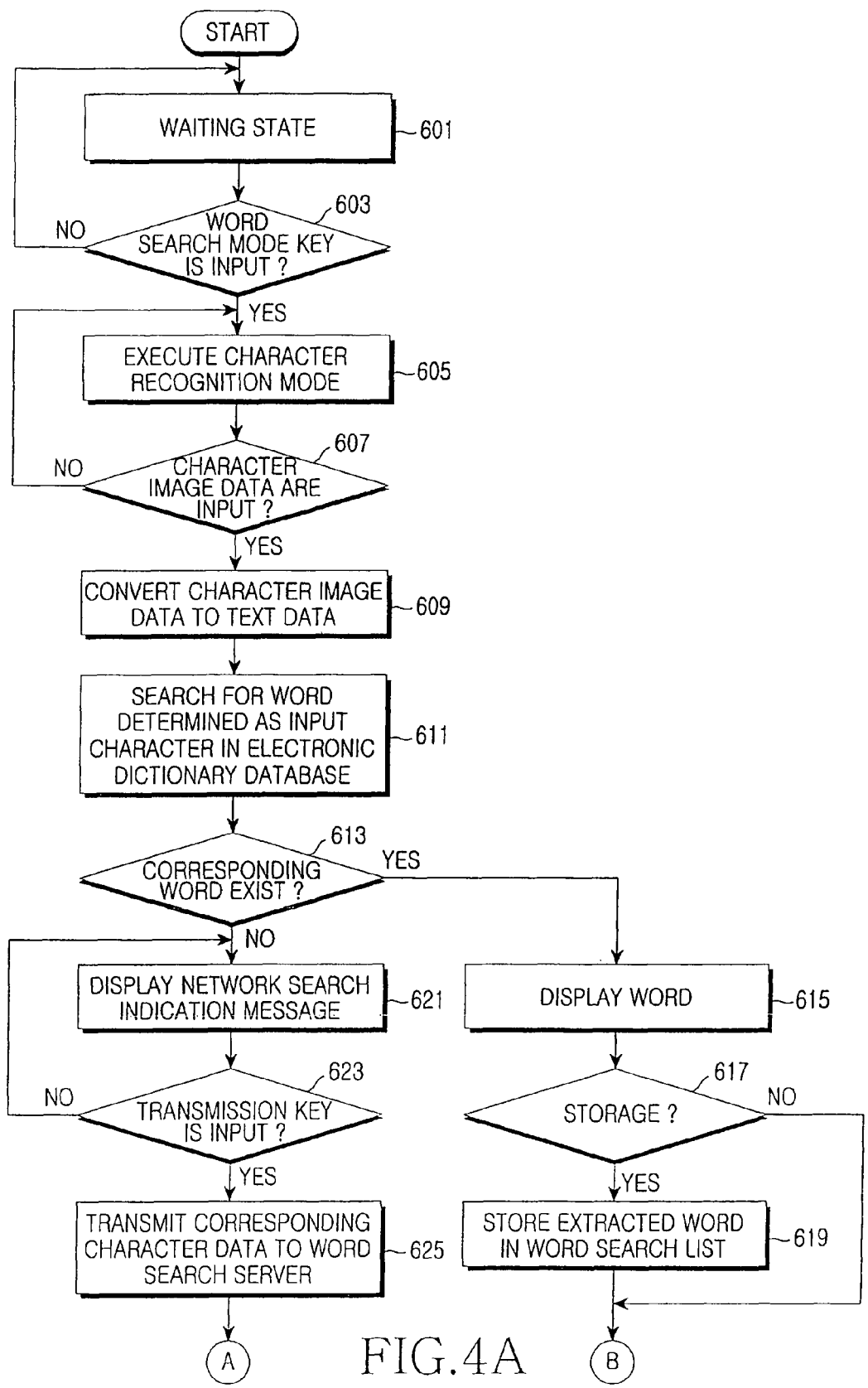
FIGS. 4a and 4b are flow diagrams illustrating a word search operation in a wireless terminal having an electronic dictionary function according to an exemplary embodiment of the present invention.
Figure 4B:
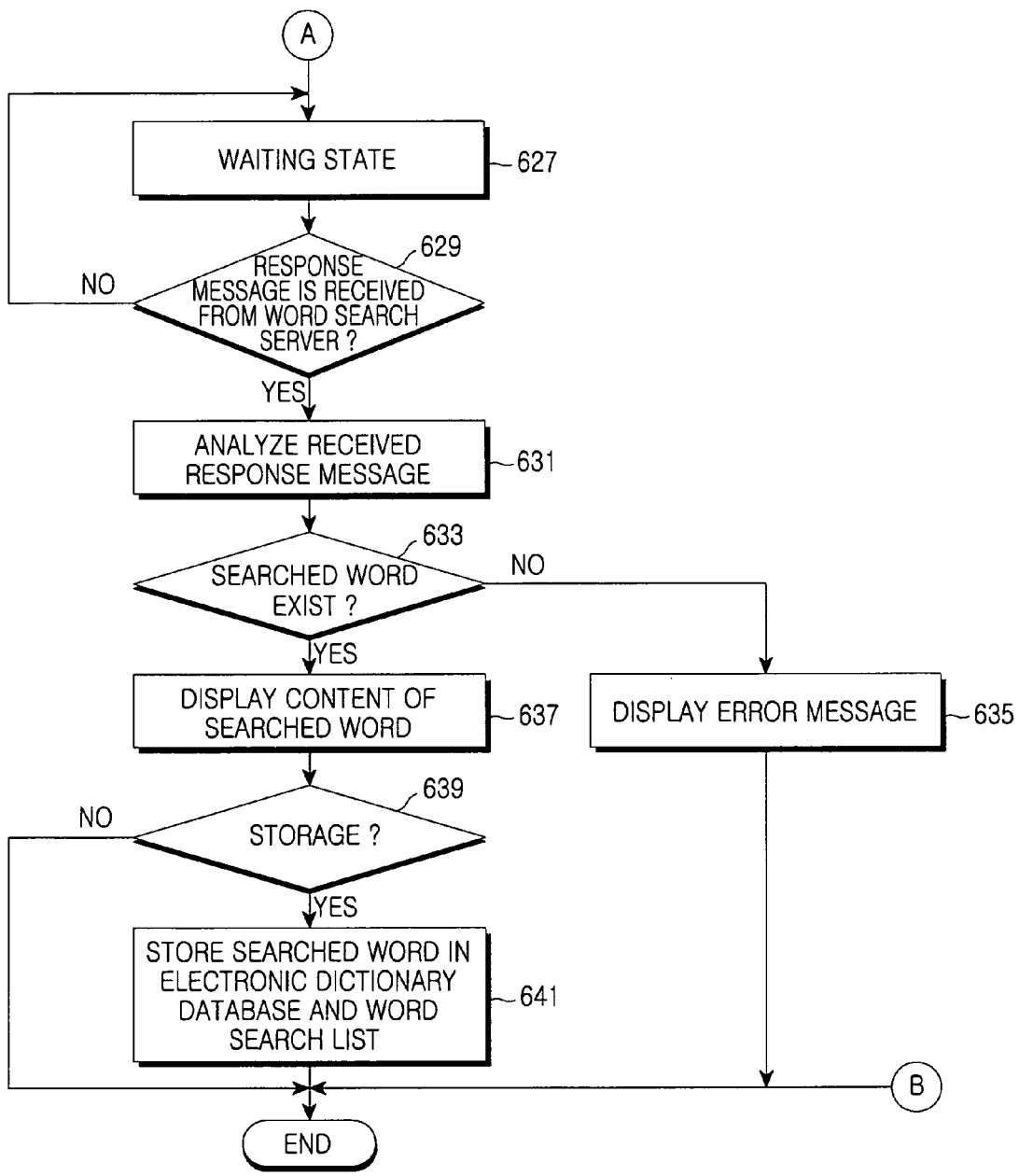

FIGS. 4a and 4b are flow diagrams illustrating a word search operation in the wireless terminal having the electronic dictionary function according to an exemplary embodiment of the present invention, and FIG. 7 is a flow diagram illustrating the word search operation applied to an exemplary embodiment of the present invention. Hereinafter, an operation for searching for words through the character recognition mode, and searching for words using a network when no words are found, in the wireless terminal having the electronic dictionary function will be described with reference to FIGS. 4a, 4b and FIG. 7. If a user inputs the word search mode key using the keypad 27 in step 601 (waiting state), the controller 10 detects the input of the word search mode key in step 603. In step 605, the controller 10 controls the memory 29 and the character recognition module 30 to execute the character recognition mode. In the character recognition mode, the controller 10 differentiates black character regions from white background regions through the character recognition module 30 such as a scanner. For example, the controller 10 further thickens the black character regions and lightens the white background regions. Then, the controller 10 recognizes the differentiated black character regions as character regions.

If characters are input through the character recognition module 30 in the character recognition mode, the controller 10 detects the input of the characters in step 607. In step 609, the controller 10 controls the memory 29, recognizes the input characters as image data, converts the image data into code values, and converts the code values into text data. In an exemplary implementation, if an error occurs in which the corresponding characters are not recognized more than a threshold number of times during the character recognition mode, an error message may be displayed.

In step 611, the controller 10 controls the memory 29 and searches for the word determined by the input characters in the electronic dictionary database.

As a result of the search, if the word determined by the input characters exists, the controller 10 detects the existence of the word in step 613. In step 615, the controller 10 controls the memory 29 and the display unit 80, analyzes the word searched for in the electronic dictionary database, and displays the analyzed word. In an exemplary implementation, the controller 10 may store the searched word in the memory 29 or a temporary buffer. Then, if the user inputs the confirmation key using the keypad 27, the controller 10 can display the content of the electronic dictionary corresponding to the searched word as illustrated in FIG. 7c. In an exemplary implementation, if multiple words have been found, steps 521, 523, 525, 527, 529 and 531 of FIG. 3b may be performed. Then, if the user inputs the storage key using the keypad 27, the controller 10 detects the input of the storage key in step 617. In step 619, the controller 10 controls the memory 29 to store the searched word in the word search list.

However, if the word determined by the input characters does not exist, the controller 10 detects the absence of the word in step 613. In step 621, the controller 10 controls the memory 29 and the display unit 80 to display a network search indication message. Then, if the user inputs the transmission key (network search permission key) using the keypad 27, the controller 10 detects the input of the transmission key in step 623. In step 625, the controller 10 controls the memory 29 and the RF unit 21 to transmit corresponding character data to the word search server. The corresponding character data are transmitted to the word search server through a mobile communication network including a Base Transceiver Station (BTS), a Base Station Controller (BSC), a Mobile Switching Center (MSC), a Home Location Register (HLR) and a gateway.

After transmitting the corresponding character data to the word search server, if a response message is transmitted from the word search server to the RF unit 21 in step 627 (waiting state), the controller 10 detects the reception of the response message in step 629. In step 631, the controller 10 analyzes the received response message.

As a result of the analysis, if no words are found in the word search server, the controller 10 detects the absence of the word in step 633. In step 635, the controller 10 controls the memory 29 and the display unit 80 to display an error message.

However, if a word is found in the word search server, the controller 10 detects the existence of the word in step 633. In step 637, the controller 10 controls the memory 29 and the display unit 80 to display the content of the searched word as illustrated in FIG. 7c. In an exemplary implementation, first, if the searched word is displayed and the user inputs the confirmation key using the keypad 27, the controller 10 may display the content of the searched word. If multiple words have been found, steps 521, 523, 525, 527, 529 and 531 of FIG. 3b may be performed.

Then, if the user inputs the storage key using the keypad 27, the controller 10 detects the input of the storage key in step 639. In step 641, the controller 10 controls the memory 29 and the display unit 80, thereby storing the searched word in the word search list and updating the content of the searched data to the electronic dictionary database.

Figure 5A:
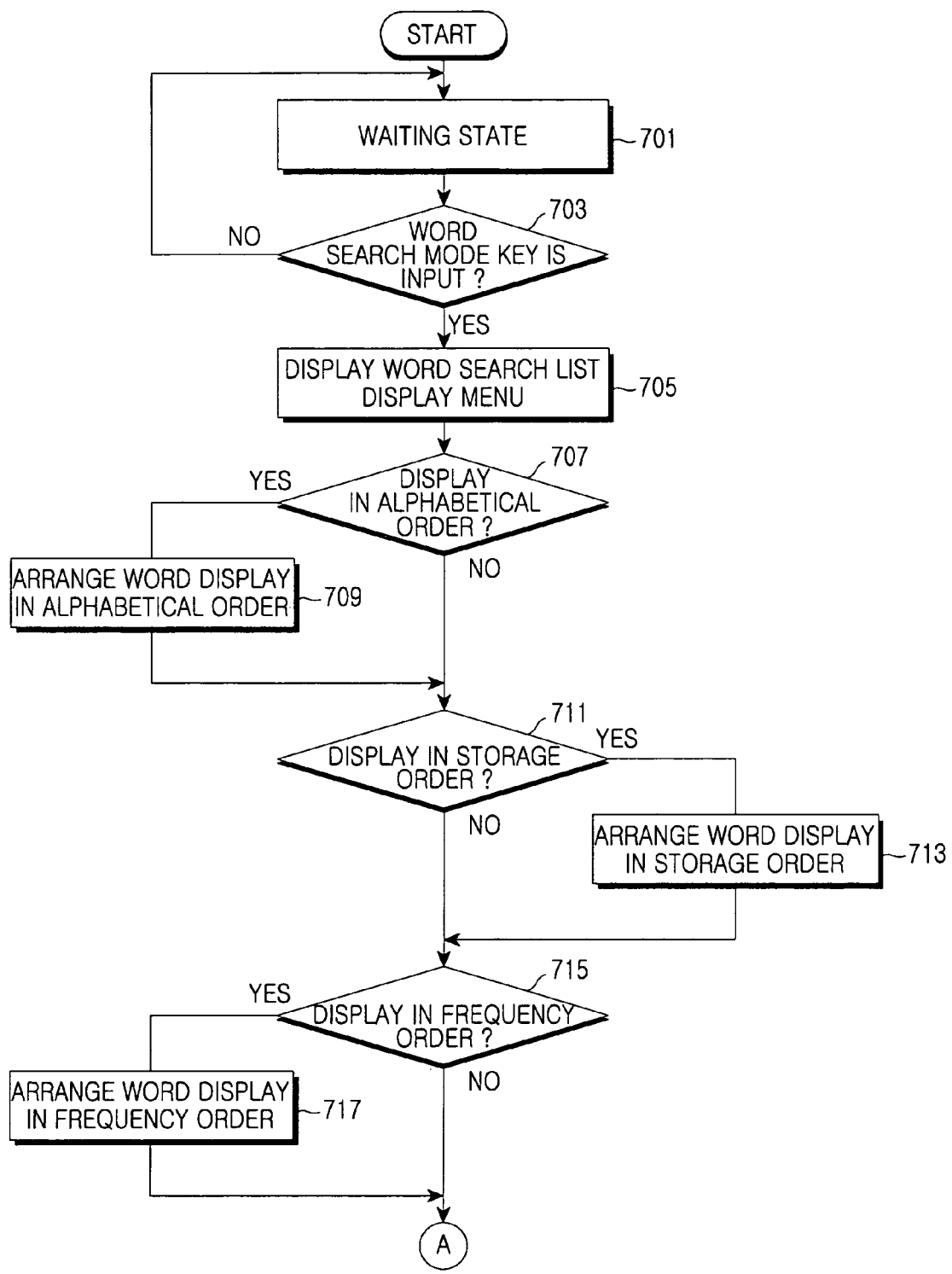
FIGS. 5a and 5b are flow diagrams illustrating an operation for confirming a searched word in a wireless terminal having an electronic dictionary function according to an exemplary embodiment of the present invention.
Figure 5B:
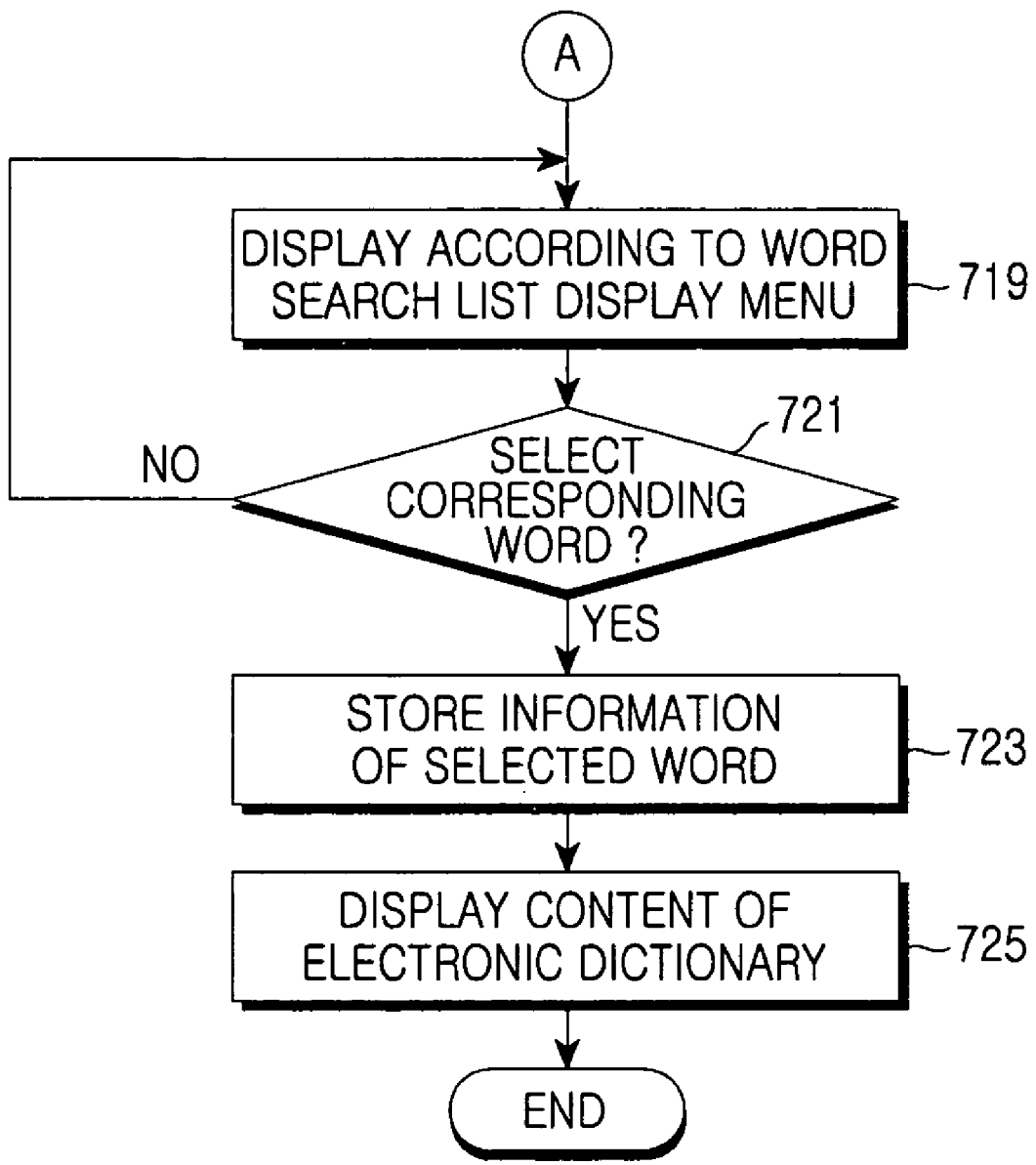

FIGS. 5a and 5b are flow diagrams illustrating an operation for confirming a searched word in the wireless terminal having the electronic dictionary function according to an exemplary embodiment of the present invention. Hereinafter, the operation for confirming the searched word in the wireless terminal having the electronic dictionary function will be described with reference to FIGS. 5a and 5b. If a user inputs a word search list confirmation key using the keypad 27 in step 701 (waiting state), the controller 10 detects the input of the word search list confirmation key in step 703. In step 705, the controller 10 controls the memory 29 and the display unit 80 to display a menu for displaying the word search list as illustrated in table 1 below.

TABLE 1

| | Word search list display menu |
|---|---|
| 1 | Display in alphabetical (letter) order |
| 2 | Display in storage order |
| 3 | Display in frequency order |

First, if the user selects item "1" [display in alphabetical (letter) order] using the keypad 27 in table 1, the controller 10 detects the selection of item "1" in step 707. In step 709, the controller 10 controls the memory 29 to arrange words within the word search list in alphabetical (letter) order.

Next, if the user selects item "2" (display in storage order) using the keypad 27, the controller 10 detects the selection of item "2" in step 711. In step 713, the controller 10 controls the memory 29, confirms time information based on which words registered in the word search list are stored, and arranges the words in storage order.

Last, if the user selects item "3" (display in frequency order) using the keypad 27, the controller 10 detects the selection of item "3" in step 715. In step 717, the controller 10 controls the memory 29, confirms information about the number of times which words registered in the word search list have been confirmed, and arranges the words in frequency order.

In step 719, the controller 10 controls the memory 29 and the display unit 80 to display the words within the word search list according to the word search list display menu. That is, if the user selects item "1" (display in alphabetical order), the controller 10 displays the words in alphabetical (letter) order. If the user selects item "2" (display in storage order), the controller 10 displays the words in storage order. If the user selects item "3" (display in frequency order), the controller 10 displays the words in frequency order.

When the words within the word search list have been displayed according to the word search list display menu, if the user selects a predetermined word using the keypad 27 in order to view the content of the electronic dictionary corresponding to the predetermined word, the controller 10 detects the selection of the corresponding word in step 721. In step 723, the controller 10 controls the memory 29 to update and store the information of the selected word. In an exemplary implementation, the information of the selected word may include information about the number of confirmations. For example, if a word "apple" previously confirmed twice has been confirmed again, the number of confirmations of the word "apple" is updated to three and stored.

In step 725, the controller 10 controls the memory 29 and the display unit 80 to display the content of the electronic dictionary corresponding to the selected word as illustrated FIG. 7c.

According to an exemplary embodiment of the present invention as described above, an electronic dictionary function is used, so that a word to be searched for can be found with precision, without inputting keys one by one corresponding to characters of. Further, when multiple words are found, a user can select a corresponding word. Furthermore, if a word to be searched for does not exist in an electronic dictionary database, the word can be searched through a network. Consequently, the use of the electronic dictionary is convenient.

While the invention has been shown and described with reference to certain exemplary embodiments thereof, it will be understood by those skilled in the art that various changes in form and details may be made therein without departing from the scope and spirit of the invention as defined by the appended claims and their equivalents.

What is claimed is:

1. A method for providing an electronic dictionary function in a wireless terminal, the method comprising:
    searching for a first word in an electronic dictionary, the word comprising first characters input through a character recognition mode, when the wireless terminal is in a word search mode;
    when a number of found words comprising the first characters exceeds a threshold, executing a speech recognition mode;
    searching for a second word in the found words of the word search mode, the second word corresponding to speech input through the speech recognition mode;
    displaying a content of the electronic dictionary corresponding to the second word; and
    storing the second word.

2. The method as claimed in claim 1, wherein the searching for a second word comprises extracting the second word searched through the speech recognition mode.

3. The method as claimed in claim 1, wherein, in the speech recognition mode, speech is recognized according to at least one of character sequences and syllables.

4. The method as claimed in claim 1, wherein the first and second words are substantially the same.

5. The method as claimed in claim 1, further comprising:
    when at least two words have been found in the word search mode, displaying the found words for selection; and
    when a corresponding word is selected from the displayed words, displaying a content of the electronic dictionary corresponding to the selected word.

6. The method as claimed in claim 5, further comprising displaying a content of the electronic dictionary corresponding to the selected, when the number of found words is one.

7. The method as claimed in claim 5, further comprising:
displaying an error message, when the number of found words is zero; and
providing for a repeat input of the characters through the character recognition mode, when request is received.

8. A method for providing an electronic dictionary function in a wireless terminal, the method comprising:
searching for a first word in an electronic dictionary, the word comprising characters input through a character recognition mode, when the wireless terminal is in a word search mode;
when a number of found words is zero, executing a speech recognition mode;
searching for a second word corresponding to speech input through the speech recognition mode in the electronic dictionary;
displaying a content of the electronic dictionary corresponding to the second word; and
storing the second word in a word search list.

9. The method as claimed in claim 8, wherein the searching for a second word comprises extracting the second word searched through the speech recognition mode.

10. The method as claimed in claim 8, wherein, in the speech recognition mode, speech is recognized according to at least one of character sequences and syllables.

11. The method as claimed in claim 8, further comprising executing the speech recognition mode, when an error in an operation of the character recognition mode occurs more than a threshold number of times in the word search mode.

12. The method as claimed in claim 8, wherein the first and second words are substantially the same.

13. The method as claimed in claim 8, further comprising:
when a number of found words is zero in the word search mode, transmitting the input character data to a word search server;
when a response message is received from the word search server, analyzing the received response message;
when a word searched for in the word search server is found, displaying a content of the searched word; and
when a storage key is input, storing the searched word in a word search list, and updating the content of the displayed word to the electronic dictionary.

14. The method as claimed in claim 13, further comprising the steps of:
when the number of words is zero, displaying a network search indication message;
when a network search permission key is input, transmitting the input character data to the word search server.

15. The method as claimed in claim 13, further comprising displaying an error message when the word searched for in the word search server is not found.

16. The method as claimed in claim 13, wherein the displaying of the content of the searched word comprises:
displaying the searched word; and
when a confirmation key is input, displaying the content of the searched word.

17. The method as claimed in claim 13, further comprising:
when at least two search words comprising the character data are found in the word search server, displaying the found searched words for selection; and
when a corresponding word is selected from the displayed words, displaying a content of the selected word.

18. A wireless terminal comprising:
a controller executing a character recognition mode for searching for a first word in an electronic dictionary, the word comprising characters input, executing a speech recognition mode for searching for a second word corresponding to speech input through the speech recognition mode, and extracting a searched word;
a character recognition module for recognizing characters to be searched through the electronic dictionary; and
a display for displaying a content of the electronic dictionary corresponding to the extracted word.

19. The wireless terminal as claimed in claim 18, further comprising a memory for storing the extracted word.

20. The wireless terminal as claimed in claim 18, wherein the first and second words are substantially the same.

* * * * *